J. A. Hafner,

Horse Power.

No. 86,533.   Patented Feb. 2, 1869.

WITNESSES.
Leopold Evert
Harry King

INVENTOR:
John A. Hafner
per
Alexander Mason
attorneys

UNITED STATES PATENT OFFICE.

JOHN A. HAFNER, OF COMMERCE, MISSOURI.

IMPROVEMENT IN HORSE-POWER CONNECTION.

Specification forming part of Letters Patent No. 86,533, dated February 2, 1869.

*To all whom it may concern:*

Be it known that I, JOHN A. HAFNER, of Commerce, in the county of Scott, and in the State of Missouri, have invented certain new and useful Improvements in Horse-Power Connections; and do hereby declare that the following is a full, clear, and exact description thereof, reference being had to the accompanying drawings, and to the letters of reference marked thereon.

My invention relates to the improvement in horse-power connections patented by me October 13, 1868; and consists in the construction of the spring and the manner of securing the same.

The spring heretofore used in this class of connections has been found open to very serious objections, as a spring made in the usual manner of one plate or bar will easily break, and cannot stand the strain upon it. It will take a spring made of a bar of about one-fourth of an inch in thickness, two and a half inches wide, and ten feet long, coiled in a casing about ten inches in diameter, to have the right elasticity; but the grain of the steel is strained a great deal in bending it to as small a circumference, on account of the steel having to be so thick. Thus, when there is much power applied or the horses give a sudden jerk, the spring breaks, on account of having no support but what the grain of the steel will stand; and this is strained already. The spring being about one-fourth of an inch thick, there comes an immense strain on the outside plate when drawn to a small circumference.

My invention entirely obviates this difficulty; and in order to enable others skilled in the art to make and use the same, I will now proceed to describe its construction and operation, referring to the annexed drawings, which form a part of this specification, in which—

Figure 1:
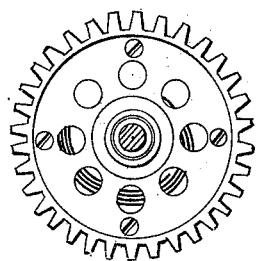
Figure 2:
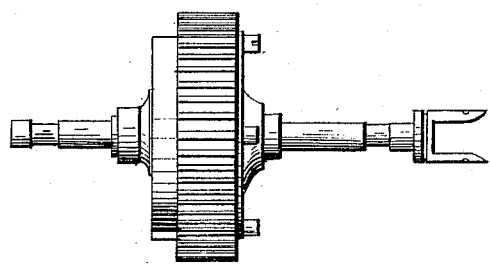
Figure 3:
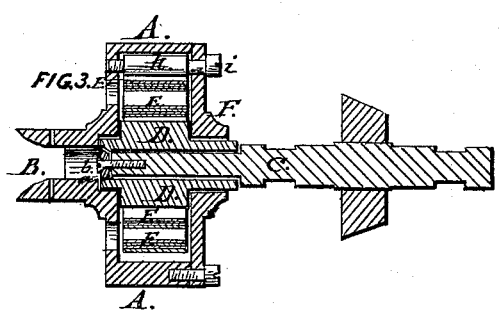
Figure 4:
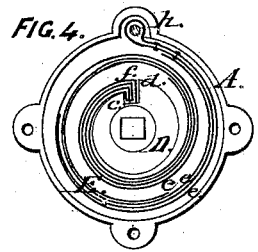
Figure 5:
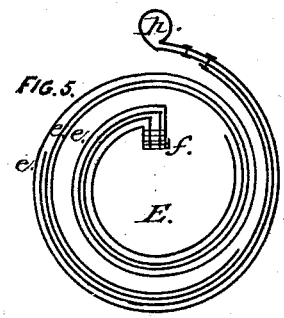

Figure 1 is a front view of a cog-wheel forming a casing for the spring. Fig. 2 is a side view of the same, with clutch-shaft passing through. Fig. 3 is a vertical section of the casing of the clutch and shaft. Fig. 4 is an inside view of the casing, showing the manner of fastening the spring; and Fig. 5 is a side view of the spring, of enlarged dimension.

A represents the casing, of which the clutch B forms a part. C is the shaft inserted in said casing for turning the machine, to which the clutch may be connected. On that end of the shaft C which is inserted in the casing A is placed a roller, D, secured to the shaft by means of a nut, $a$, and screw $b$. The nut $a$ has beveled sides, and is inserted in the hole on the roller D, where the end of the shaft C will extend. The screw $b$ is then passed through a hole in the center of the nut, and screwed into the center of the shaft C, as shown in Fig. 3. The sides of nut $a$ being beveled, it will be impossible to pull the shaft C out without unscrewing the screw $b$.

I may secure the roller D by having a tenon on the end of the shaft C, to project beyond the end of the roller, and then placing a nut on said tenon. I do not confine myself to any particular mode of securing the roller, as that is immaterial. It is the roller itself in this connection which I desire to claim as an improvement.

The roller D is cut with a slot, $c$, and its sides are of the irregular shape shown in Fig. 4, one side, $d$, of the slot extending beyond the other a suitable distance, for a purpose that will be hereinafter explained.

The spring E is made of two or more bars or plates, $e\ e$, riveted together at one end, and bent so as to form a hook, $f$, as shown in Fig. 5.

The outside leaf or plate, it will be seen, forms a scroll, $h$, and is doubled under, extending part of the way, while the inner leaves or plates do not extend as far as the outer. It is, however, immaterial how far the inner leaves extend. They may, if so desired, be made longer than the outside leaf, and extend beyond the same. Thus I can make a coiled spring of very thin steel, and by using the requisite number of leaves it will be as strong and elastic as may be desired, the outside leaf forming the connection and the inner supporters or bearers.

The hook $f$ on the end of the spring E thus formed is inserted in the slot $c$ on the roller D, the side $d$ of said roller projecting slightly above the sharp edge of said hook, as shown in Fig. 4, so that when the spring is compressed in the casing it will not lie on this sharp corner, thereby preventing any liability of its being injured by the same. The other end of the spring is secured to the casing by means of one of the screws $i$, which secures the lid F to the casing, passing through the scroll $h$, formed of the outside leaf of the spring. The scroll $h$ thus works like a hinge on the bolt $i$ while it is expanding or contracting.

In cases where the clutch is on the end of the shaft, and said shaft passes through a casing or cog-wheel, as shown in Figs. 1 and 2, the roller is secured inside of such casing on the shaft in any manner desired, and the spring applied as above described.

Having thus fully described my invention, what I claim as new, and desire to secure by Letter Patent, is—

1. The spring E, constructed, as described, of two or more leaves, $e\ e$, riveted together at one end, forming a hook, $f$, and the outside leaf having at its other end a scroll, $h$, through which a bolt, pin, or screw is passed to secure the spring, and at the same time allow it to work like a hinge, the outer leaf thus forming the connection and the inner leaf or leaves the support for the same, substantially as and for the purposes herein set forth.

2. In combination with the spring E thus constructed, the roller D, when secured to the shaft C and provided with a slot, $c$, in which the hook $f$ of the spring is inserted, one side, $d$, of said slot projecting above the other, so as to prevent the spring when passing around the roller from resting on and being injured by the sharp corner for the hook, substantially as herein set forth.

In testimony that I claim the foregoing I have hereunto set my hand this 14th day of November, 1868.

JOHN A. HAFNER.

Witnesses:
JOHN KIRKPATRICK,
HENRY SCHOEN.